United States Patent
Fisk et al.

(10) Patent No.: US 6,480,655 B1
(45) Date of Patent: Nov. 12, 2002

(54) APPARATUS FOR THE MEASUREMENT OF PAPERBOARD STRAIN IN A CONFINED AREA

(75) Inventors: Jeffery Alan Fisk, Olney, MD (US); Richard Eric Nordgren, Daleville, VA (US)

(73) Assignee: MeadeWestvaco Corporation, Stamford, CT (US)

( * ) Notice: Subject to any disclaimer, the term of this patent is extended or adjusted under 35 U.S.C. 154(b) by 0 days.

(21) Appl. No.: 09/542,015

(22) Filed: Apr. 3, 2000

(51) Int. Cl.[7] .................................................. G02B 6/06
(52) U.S. Cl. ........................ 385/117; 356/32; 385/118
(58) Field of Search .......................... 385/117; 250/234, 250/306; 356/32, 375, 383, 384, 387, 614, 634, 635, 640; 73/104; 128/4–8

(56) References Cited

U.S. PATENT DOCUMENTS

| | | | | |
|---|---|---|---|---|
| 4,664,486 A | * | 5/1987 | Landre et al. | |
| 4,762,120 A | * | 8/1988 | Hussein | |
| 4,800,890 A | * | 1/1989 | Cramer | |
| 5,726,907 A | | 3/1998 | Davidson et al. | |
| 5,757,473 A | | 5/1998 | Kanduth et al. | |
| 5,798,521 A | | 8/1998 | Froggatt | |
| 5,811,796 A | * | 9/1998 | Marchman et al. | |
| 5,812,251 A | | 9/1998 | Manesh | |
| 5,821,426 A | | 10/1998 | Uchiyama | |
| 5,828,059 A | | 10/1998 | Udd | |
| 5,880,463 A | | 3/1999 | Uchiyama | |
| 5,920,383 A | * | 7/1999 | Chen et al. | |

* cited by examiner

Primary Examiner—Frank G. Font
Assistant Examiner—Michael P Mooney
(74) Attorney, Agent, or Firm—Donald L. Bowman; Richard L. Schmalz

(57) ABSTRACT

This invention concerns a technique and an apparatus that is used for the measurement of bi-axial strain in printed paperboard or paperboard based laminates. Such strain information is useful for determining the margin to failure of various features of laminated paperboard cartons, such as those used in the liquid packaging industry. Knowing such margins of failure is crucial for ensuring integrity of the microbiological barrier in aseptic liquid packaging.

9 Claims, 7 Drawing Sheets

APPARATUS FOR THE MEASUREMENT OF PAPERBOARD STRAIN IN A CONFINED AREA

BACKGROUND OF THE INVENTION

1. Field of the Invention

This invention concerns a technique and an apparatus that is used for the measurement of bi-axial strain in printed paperboard or paperboard based laminates. Such strain information is useful for determining the margin to failure of various features of laminated paperboard cartons, such as those used in the liquid packaging industry. Knowing such margins of failure is crucial for ensuring integrity of the microbiological barrier in aseptic liquid packaging.

2. Description of the Related Art

It is known that visual access to the web and carton forming area is hindered by packaging machinery, making in-process strain measurement very difficult. Furthermore, the geometry of the web changes considerably during the forming process, thereby making traditional optical strain measurement techniques unworkable.

It is also known in the current practice of strain measurement to use a digital camera to photograph an area having test points or reference points marked. Exemplary of such prior art is U.S. Pat. No. 5,726,907 ('907) to D. L. Davidson et al., entitled "Bi-Axial Non-Contacting Strain Measurement Using Machine Vision". As discussed above, the '907 reference uses a digital camera to photograph an area of a sample having test points or reference points marked, which allow any subsequent strain of the sample to be determined by relative movement of the test points from one another. Using a digital computer, the measurement of strain within the sample may be automated. While the above principle works well for unidirectional strains, it will only work for bi-axial strains if the geometry between the camera and sample is preserved throughout the strain process. If the focal length and/or incident angle of the focal axis changes in an uncertain manner, little useful information can be deduced.

Finally, it is known to photograph a specimen in unstrained states. Exemplary of such prior art are U.S. Pat. No. 5,757,473 ('473) to H. Kanduth et al., entitled "Optical Strain Sensor for the Measurement of Microdeformations of Surfaces", U.S. Pat. No. 5,812,251 ('251) to A. Manesh, entitled "Electro-Optic Strain Gages and Transducer", and U.S. Pat. No. 5,920,383 ('383) to F. Chen et al., entitled "Microscopic Digital Imagining Strain Gauge." Again, while the '473, '251, and '383 references employ a photograph of the specimen in strained and unstrained conditions, the access to the specimen surface must be unhindered to allow access to the microscope lenses, prisms, surface attachments, etc.

It is apparent from the above that there exists a need in the art for a measurement apparatus which can measure paperboard strain in a confined area, but which at the same time has a very small footprint and can make strain measurements on a surface with a small radius of curvature. It is a purpose of this invention to fulfill this and other needs in the art in a manner more apparent to the skilled artisan once given the following disclosure.

SUMMARY OF THE INVENTION

Generally speaking, this invention fulfills these needs by providing an apparatus for measuring paperboard strain, comprising a fiber optic scope means, a fiber optic tube means operatively connected to the fiber optic scope means for retaining the fiber optic scope means, and an adjustable stand-off means operatively connected to the tube means for constraining a focal length between an end of the fiber optic scope means and a surface of the paperboard.

In certain preferred embodiments, the fiber optic scope means includes a fixed, elongated fiber optic. Also, the tube means includes a bracket means. Finally, the adjustable standoff means includes an adjustment means.

In another preferred embodiment, a fiber optic scope fitted with an adjustable standoff means provides an ideal tool for the measurement of strain in the sample which is subjected to an undetermined stress field. This device is capable of maintaining a fixed geometry at a fixed focal length from the surface of the paperboard sample.

The preferred apparatus, according to this invention, offers the following advantages: lightness in weight; ease of assembly and repair; excellent strain measurement characteristics; excellent durability; excellent alignment of the fiber optic; portability; and good economy. In fact, in many of the preferred embodiments, these factors of lightness in weight, ease of assembly, excellent strain measurement, durability, fiber optic alignment, and portability are optimized to the extent that is considerably higher than heretofore achieved in prior, known apparatus for measuring paperboard strain.

The above and other features of the present invention, which will become more apparent as the description proceeds, are best understood by considering the following detailed description, in conjunction with the accompanying drawings, wherein like characters represent like parts throughout the several views and in which:

DETAILED DESCRIPTION OF THE INVENTION

Figure 1:
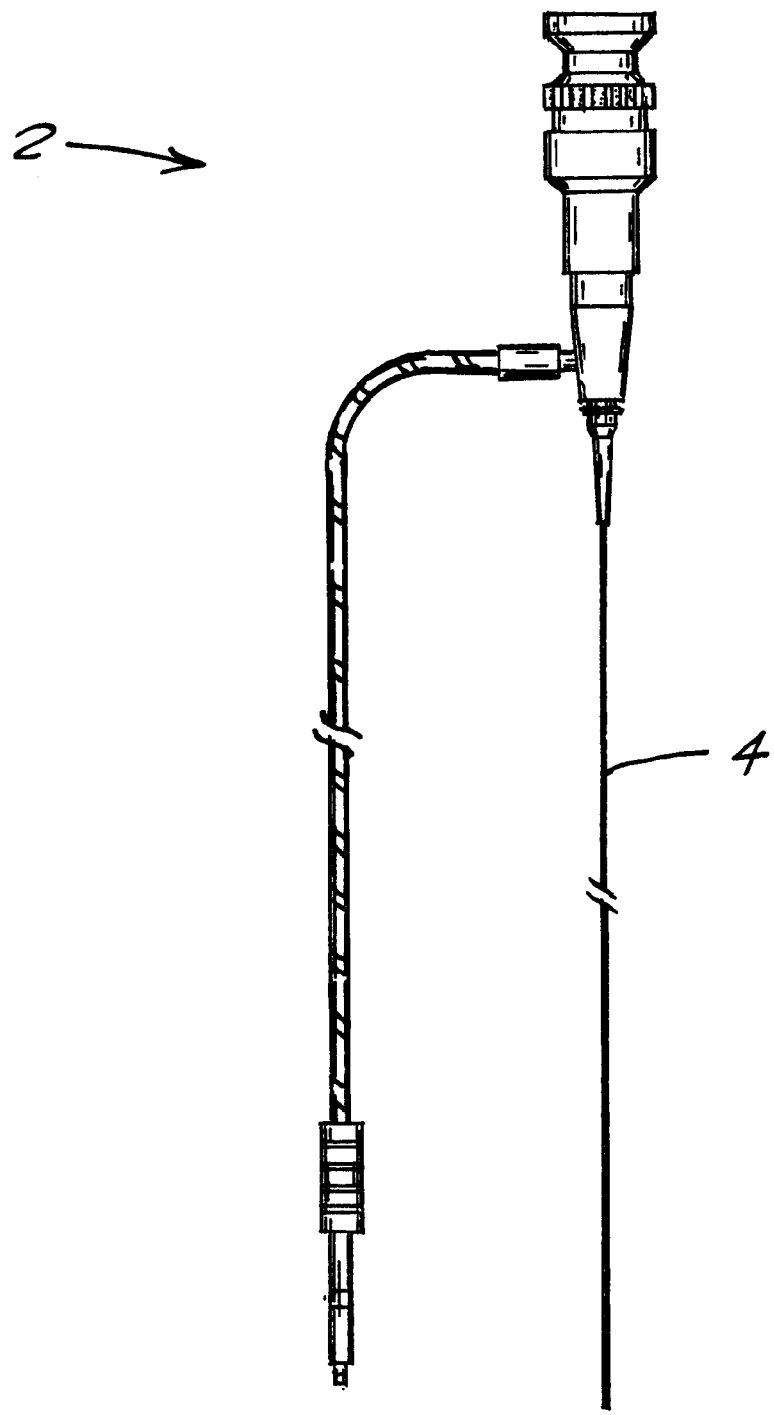
FIG. 1 is a schematic illustration of a conventional narrow fiber optical scope, according to the prior art.

With reference first to the FIG. 1, there is illustrated a conventional narrow fiber optical scope 2. Scope 2 includes, in part, conventional fiber optic 4.

Figure 2:
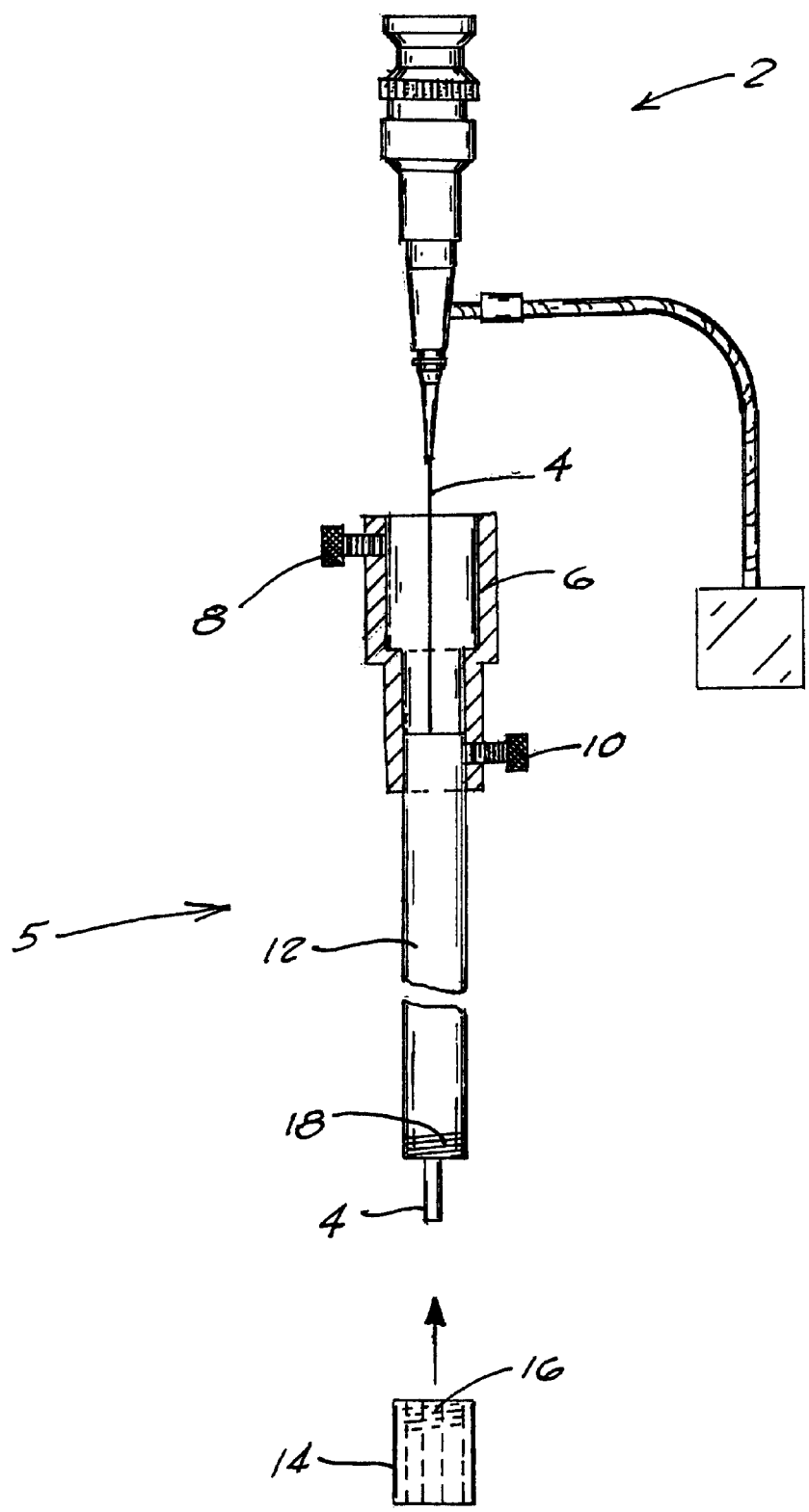
FIG. 2 is a side plan view of an apparatus for the measurement of paperboard strain in a confined area, according to the present invention.

Now with reference to FIG. 2, there is illustrated an advantageous environment for use of the concepts of this invention. In particular, apparatus 5 is illustrated. Apparatus 5 includes, in part, bracket 6, fastener 8, fastener 10, fiber optic tube means 12, adjustable stand-off 14, threads 16, and threads 18. Preferably, bracket 6 and adjustable stand-off 14 are constructed of any suitable, durable metallic material, such as stainless steel. Preferably, fasteners 8 and 10 are conventional set screws. Finally, threads 16 and 18 are placed on adjustable stand-off 14 and fiber optic tube means 12, respectively, by conventional techniques.

Figure 3:
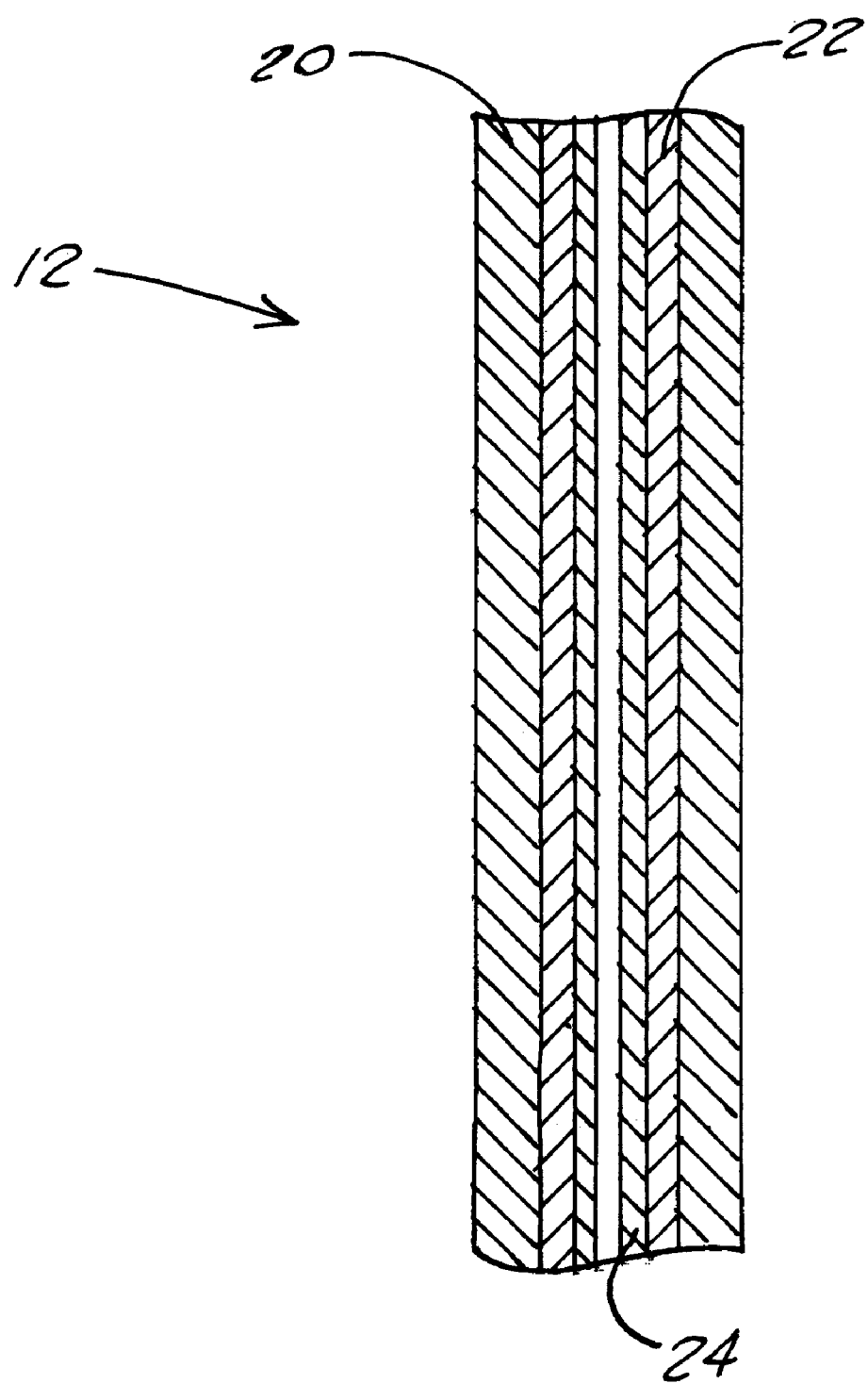
FIG. 3 is a side plan view of a fiber optic tube means located in the apparatus of FIG. 2.

As shown in FIG. 3, fiber optic tube means 12 is shown in greater detail. Tube means 12 includes, in part, three concentric rigid metallic tubes which, preferably, are constructed of stainless steel. The three tubes are numbered 20, 22, and 24 and consist of, preferably, a one-quarter inch O.D. tube 20, a one-eighth inch O.D. tube 22, and a one-sixteenth O.D. tube 24. Tube 24 also includes an inside diameter (I.D.) of 0.022 inches. This inner tube 24 is used to guide fiber optic 4 through tube means 12. Preferably, tubes 20, 22, and 24 are welded together by conventional techniques. Alternatively, a flexible tube assembly or a two tube and standoff assembly may be used so long as the distal end of fiber optic 4 is firmly affixed to the end of adjustable stand-off 14. Finally, apparatus 5 may also have a beveled end of a known angle to accommodate confined spaces while maintaining a fixed geometry.

Figure 4:
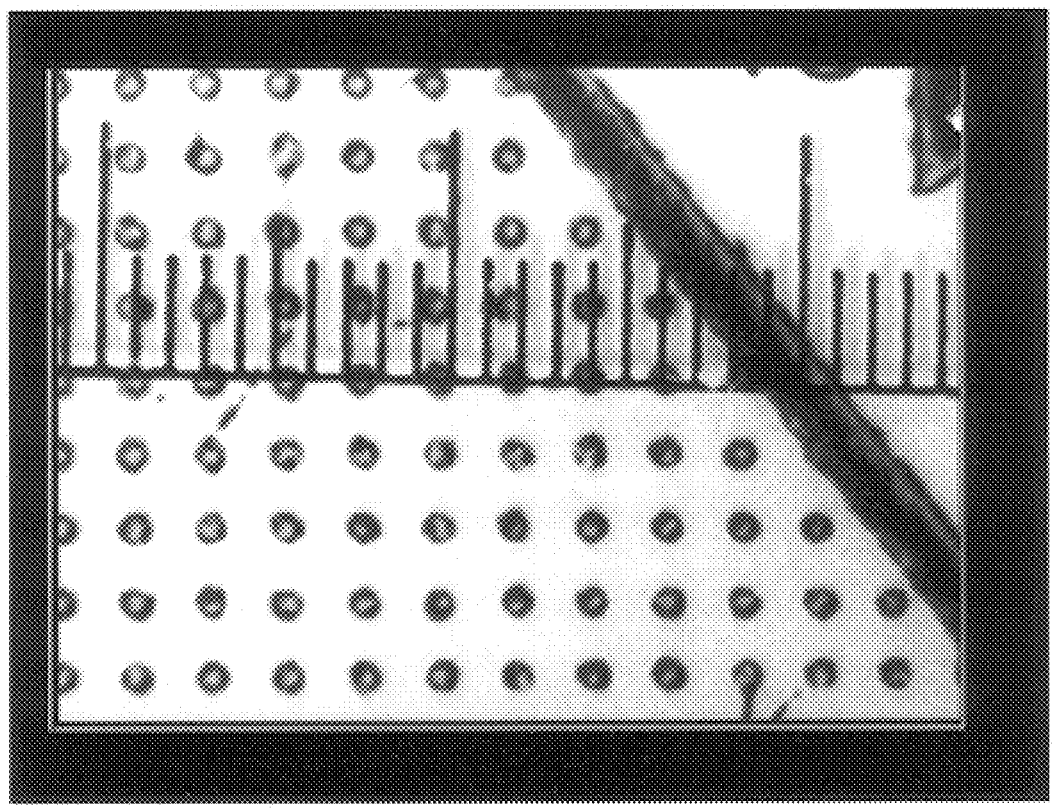
FIG. 4 is a pictorial illustration of half tones superimposed with a metric scale having 0.1 mm graduations.
Figure 5A:
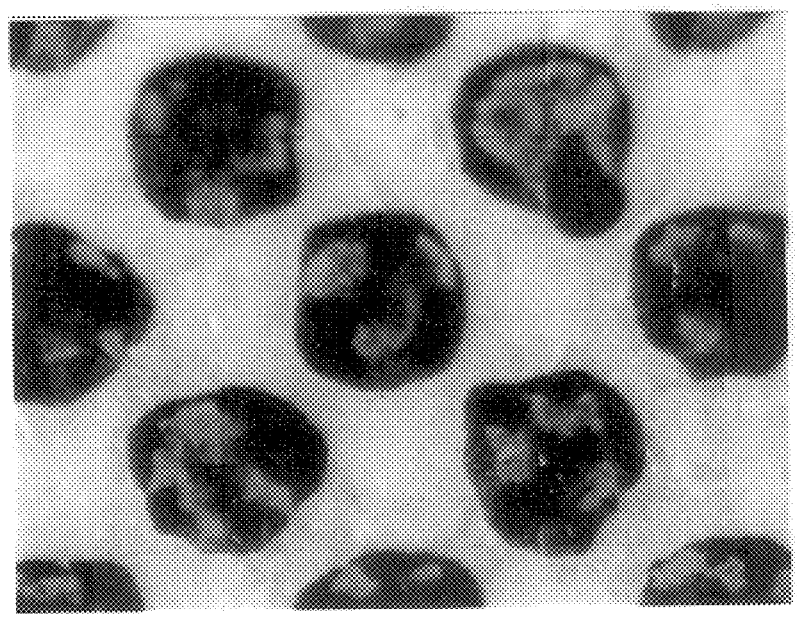
FIGS. 5a–5d are pictorial micrographs with positive and negative printed half tone images in reference and folded states.
Figure 5B:
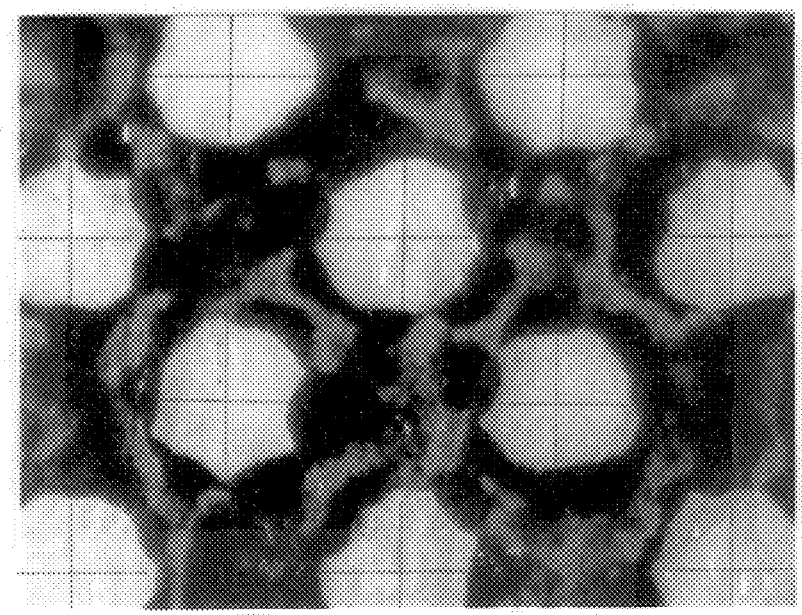
Figure 5C:
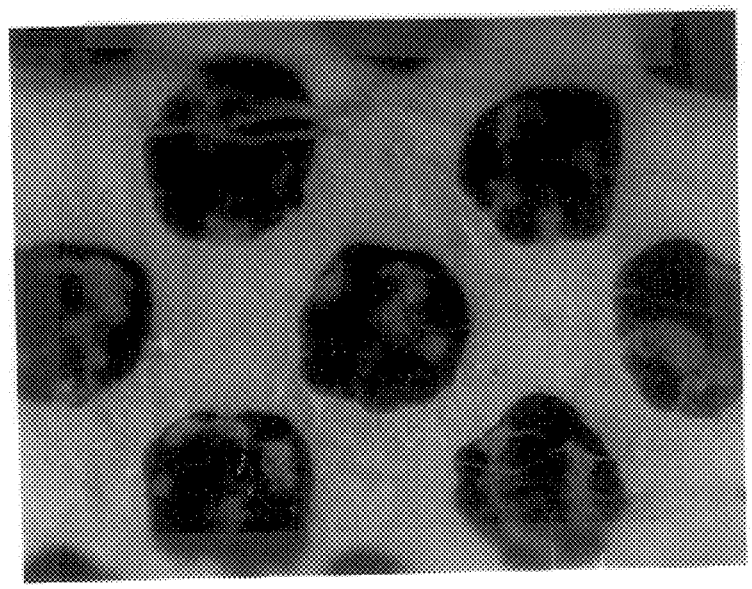
Figure 5D:
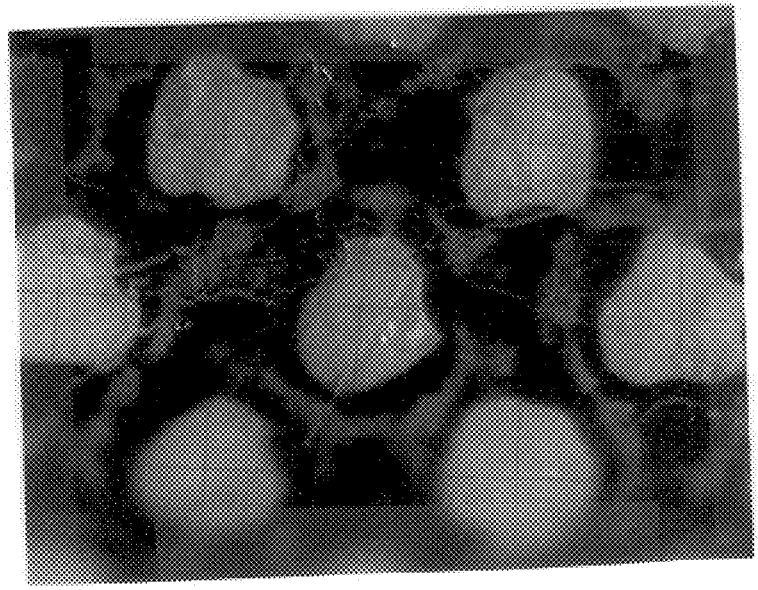

Apparatus 5 acts to constrain a focal length between the end of fiber scope 2 where fiber optic 4 interacts with adjustable stand-off 14 and the surface of a paperboard laminate such that large scale movement of the surface of the paperboard laminate from its initial "stress free" or reference location is easily accommodated by maintaining surface contact with the end of optical fiber 4 where it interacts with adjustable stand-off 14. In addition, if the paperboard laminate has been printed with a half tone image, whose dot pattern is typically a square grid with a spacing of approximately 0.2 mm (FIG. 4), the strain field of the complete structure may be easily mapped by measuring the local displacements of sets of 4 half tone dots.

As shown in FIGS. 5a–5d, reference and strain images of a paperboard laminate that have been printed with positive and negative half tones are depicted. Relative dot movement is used to measure the strain developed by bending the laminate in a 180° fold.

Figure 6A:
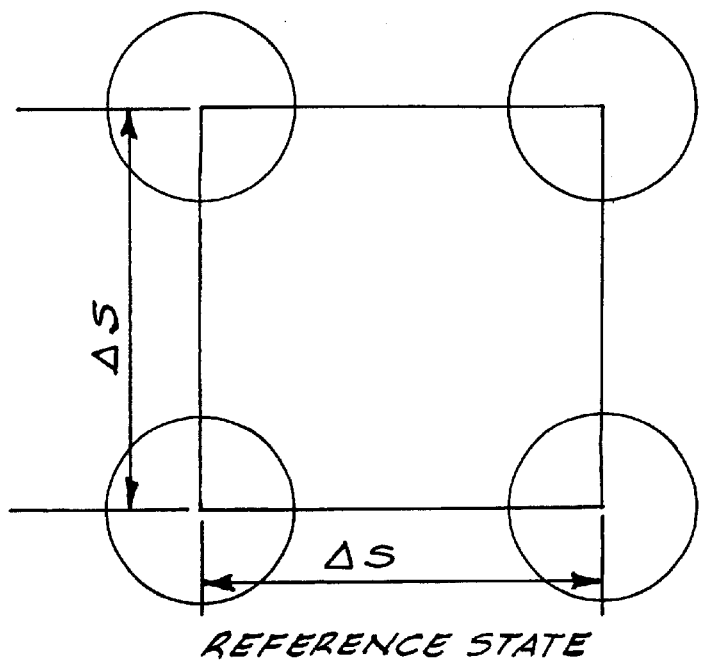
FIG. 6 is a graphical illustration of reference and strained states of a set of 4 half tone dots.
Figure 6B:
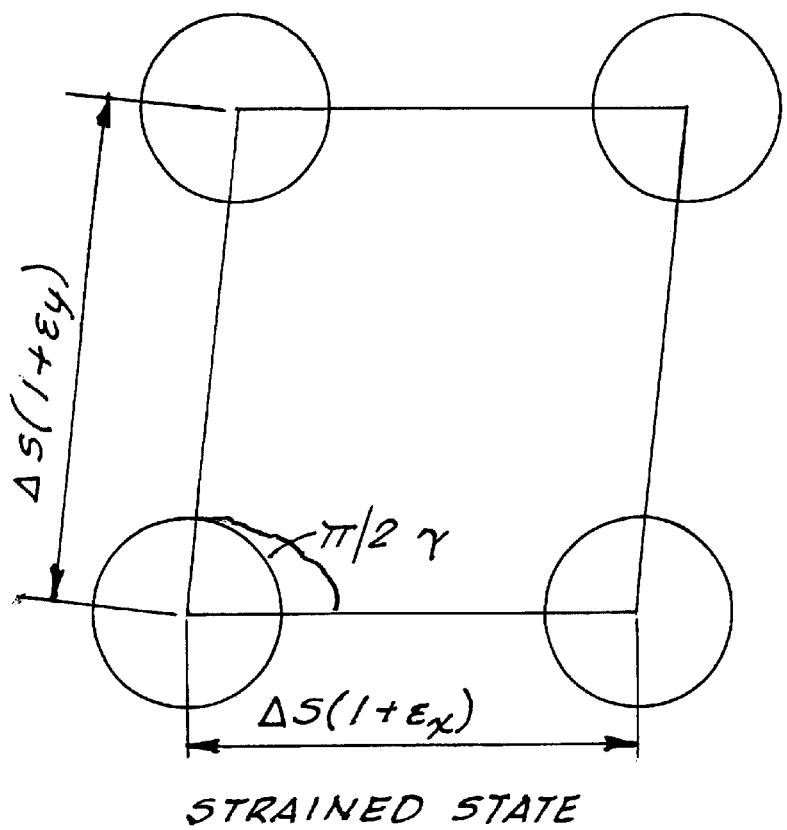

In addition, for more complex stress fields where both tensile and shear forces are present, the following equations may be used to completely describe the strain at a point (i.e., produce Mohr's Circle for plane strain) within a set of four dots, which are shown pictorially as the vertices of the "square" in reference and strained states in FIG. 6:

$$\epsilon_{ave} = \tfrac{1}{2}(\epsilon_x + \epsilon_y) \quad \text{Eq. 1}$$

$$R = \sqrt{[\tfrac{1}{2}(\epsilon_x - \epsilon_y)^2 + (\gamma_{xy}/2)^2]} \quad \text{Eq. 2}$$

where:

$\epsilon_x$: tensile strain in the 'x' direction $\epsilon_y$: tensile strain in the 'y' direction $\epsilon_{ave}$: average strain defining the origin's abscissa of Mohr's circle $\gamma_{xy}$: shear strain R: radius of Mohr's strain circle It must also be understood that apparatus 5 can be used to take a picture of the area of interest before and after the stress has been applied, as pointed out in the Description of the Related Art section.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. An apparatus for measuring paperboard strain comprising:

a fiber optic scope means;

a fiber optic tube means operatively connected to said fiber optic scope means, wherein said fiber optic tube means comprises a plurality of concentric tubes; and an adjustable stand-off means operatively connected to said fiber optic tube means for constraining a focal length between an end of said fiber optic scope means and a surface of said paperboard.

2. The apparatus of claim 1, wherein said fiber optic scope means further comprises optical fiber.

3. The apparatus of claim 1, wherein said apparatus further comprises a bracket means operatively connected to said fiber optic tube means.

4. The apparatus of claim 3, wherein said bracket means are constructed with metal.

5. The apparatus of claim 3, wherein said bracket means are constructed with stainless steel.

6. The apparatus of claim 1, wherein said plurality of concentric tubes are cylindrically shaped.

7. The apparatus of claim 1, wherein said plurality of concentric tubes are constructed with metal.

8. The apparatus of claim 1, wherein said plurality of concentric tubes are constructed with stainless steel.

9. The apparatus of claim 1, wherein said adjustable stand-off means further comprises a rotatable cylinder that substantially surrounds an end of said fiber optic scope means.

* * * * *